(12) United States Patent
Kozlov et al.

(10) Patent No.: US 11,114,291 B2
(45) Date of Patent: Sep. 7, 2021

(54) METHOD OF SEPARATING DIFFERENT IONS HAVING SIMILAR MASS TO CHARGE RATIOS

(71) Applicant: MICROMASS UK LIMITED, Wilmslow (GB)

(72) Inventors: Boris Kozlov, Manchester (GB); David J. Langridge, Bollington (GB)

(73) Assignee: MICROMASS UK LIMITED, Wilmslow (GB)

( * ) Notice: Subject to any disclaimer, the term of this patent is extended or adjusted under 35 U.S.C. 154(b) by 0 days.

(21) Appl. No.: 16/481,239

(22) PCT Filed: Jan. 23, 2018

(86) PCT No.: PCT/GB2018/050187
§ 371 (c)(1),
(2) Date: Jul. 26, 2019

(87) PCT Pub. No.: WO2018/138484
PCT Pub. Date: Aug. 2, 2018

(65) Prior Publication Data
US 2019/0393023 A1    Dec. 26, 2019

(30) Foreign Application Priority Data
Jan. 26, 2017    (GB) ...................................... 1701311

(51) Int. Cl.
*H01J 49/42*    (2006.01)
*H01J 49/40*    (2006.01)
*H01J 49/00*    (2006.01)

(52) U.S. Cl.
CPC .......... *H01J 49/4215* (2013.01); *H01J 49/40* (2013.01); *H01J 49/422* (2013.01); *H01J 49/0063* (2013.01); *H01J 49/426* (2013.01)

(58) Field of Classification Search
None
See application file for complete search history.

(56) References Cited

U.S. PATENT DOCUMENTS

| 6,166,378 A | 12/2000 | Thomson et al. |
|---|---|---|
| 6,838,665 B2 | 1/2005 | Kato |

(Continued)

FOREIGN PATENT DOCUMENTS

| GB | 2485063 A | 2/2012 | |
|---|---|---|---|
| WO | WO-2015097462 A1 * | 7/2015 | ........... G01N 27/622 |

OTHER PUBLICATIONS

Search Report for GB Application No. GB1701311.1, dated Jun. 20, 2017, 3 pages.

(Continued)

*Primary Examiner* — Andrew Smyth
(74) *Attorney, Agent, or Firm* — Kacvinsky Daisak Bluni PLLC

(57) ABSTRACT

A method of filtering ions (16) is disclosed comprising: providing an ion filter (6) having an ion entrance, an ion exit and a plurality of electrodes (18); applying an AC and/or RF voltage to at least a first electrode so as to generate a pseudo-potential barrier; and urging ions towards the pseudo-potential barrier as they travel from the entrance to the exit whilst maintaining the ion filter (6) at a pressure such that first ions are repelled by the pseudo-potential barrier and so are transmitted through the filter to said exit, whereas second ions having substantially the same mass to charge ratio as the first ions but a lower mass are not capable of being repelled by the pseudo-potential barrier and reaching said exit.

20 Claims, 1 Drawing Sheet

(56) References Cited

U.S. PATENT DOCUMENTS

| | | | |
|---|---|---|---|
| 7,312,444 B1 | 12/2007 | Willougbhy et al. | |
| 8,975,578 B2* | 3/2015 | Green | G01N 27/622 |
| | | | 250/283 |
| 8,987,660 B2 | 3/2015 | Hofstadler et al. | |
| 2003/0001084 A1 | 1/2003 | Bateman et al. | |
| 2009/0206250 A1 | 8/2009 | Wollnik | |
| 2010/0012836 A1* | 1/2010 | Mukaibatake | H01J 49/022 |
| | | | 250/292 |
| 2010/0108879 A1 | 5/2010 | Bateman et al. | |
| 2014/0103206 A1* | 4/2014 | Mukaibatake | H01J 49/062 |
| | | | 250/288 |
| 2014/0145076 A1 | 5/2014 | Park | |
| 2015/0136974 A1 | 5/2015 | Burchfield | |
| 2015/0340218 A1 | 11/2015 | Papanastasiou et al. | |
| 2016/0320340 A1 | 11/2016 | Giles et al. | |

OTHER PUBLICATIONS

International Search Report and Written Opinion for International Application PCT/GB2018/050187, dated Apr. 3, 2018, 17 pages.

* cited by examiner

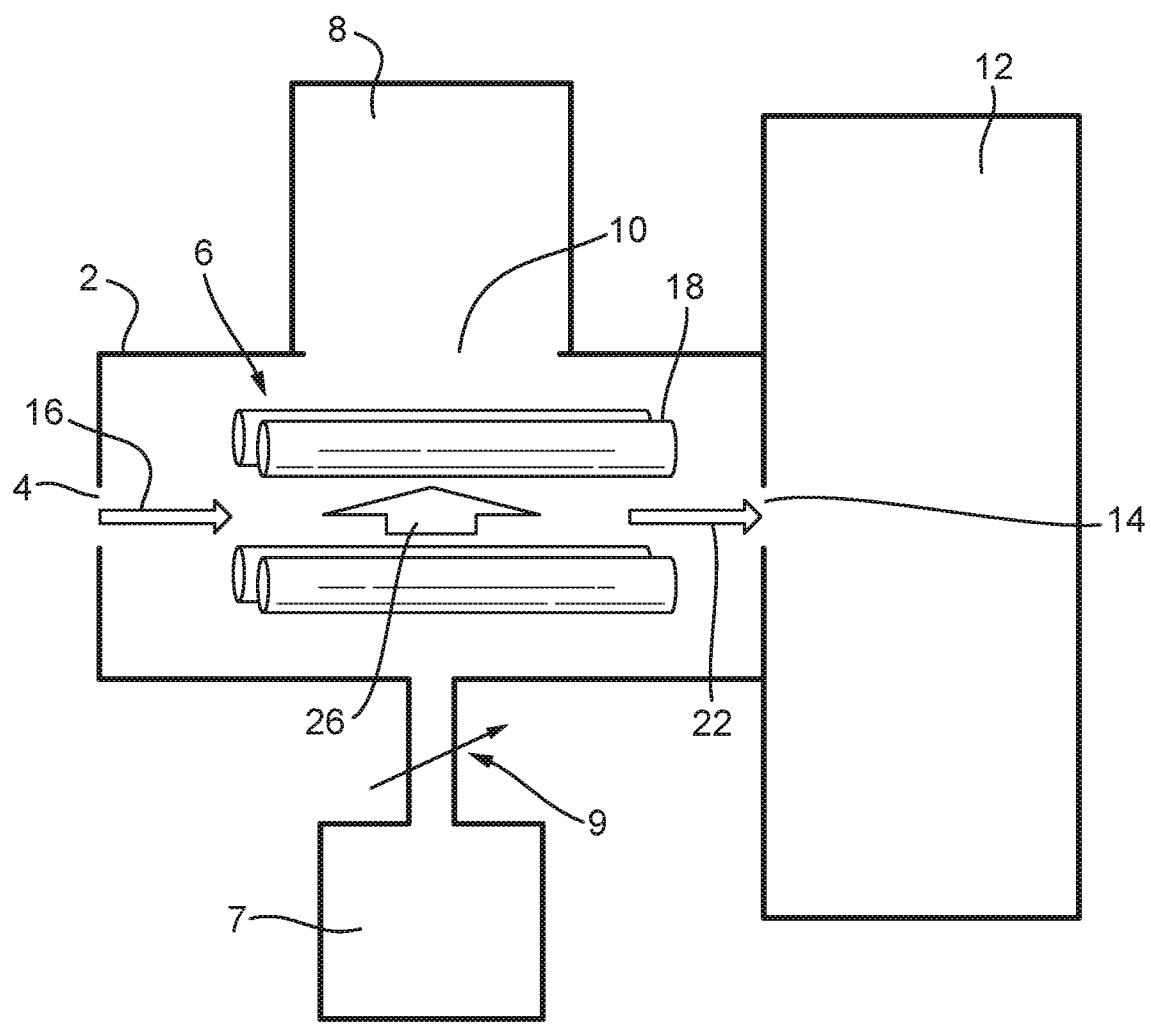

METHOD OF SEPARATING DIFFERENT IONS HAVING SIMILAR MASS TO CHARGE RATIOS

CROSS-REFERENCE TO RELATED APPLICATIONS

This application is a national phase filing claiming the benefit of and priority to International Patent Application No. PCT/GB2018/050187, filed on Jan. 23, 2018, which claims priority from and the benefit of United Kingdom patent application No. 1701311.1 filed on Jan. 26, 2017. The entire contents of these applications are incorporated herein by reference.

FIELD OF THE INVENTION

The present invention relates generally to mass spectrometers and in particular to a device for separating ions that have the same or similar mass to charge ratios, but different masses.

BACKGROUND

The mass spectral analysis of large molecular complexes has become of increasing interest in relatively recent times. This requires the analysis of relatively heavy, multiply charged ions of interest. However, one of the main problems encountered during the analysis of such ions is that many lighter, singly-charged background ions that are not of interest are present during the analysis. These background ions have mass to charge ratios that are the same, or similar to, the mass to charge ratios of the heavy, multiply charged ions of interest. These background ions therefore interfere in the analysis of the ions of interest and prevent efficient detection and analysis thereof, often creating chemical noise that masks the signals of the ions of interest. For example, singly-charged ions having masses in the range of 300-3000 Da (i.e. having m/z in the range of 300-3000) may interfere with multiply charged ions having masses in the range of 3000-300,000 Da, and possibly higher masses.

It is impossible to differentiate ions having different masses but the same mass-to-charge ratios using electromagnetic fields only. However, it is possible to separate such ions by exploiting their differences in collision cross-sections with gases, as well as exploiting differences in the efficiency of each collision with gas molecules. In simple terms, it could be said that at a low gas pressure, light ions are generally more affected by the presence of the background gas than heavy ions of the same mass to charge ratio.

It is known to remove singly-charged background ions by using an ion mobility separator coupled to a quadrupole mass filter. Ions are accumulated in an ion trap and pulsed into an ion mobility drift tube. The ions are driven through the gas in the drift tube by a potential difference along the tube and separate according to their ion mobility through the gas as they pass along the drift tube. Ions of different ion mobility therefore emerge from the drift tube at different times. For ions having the same mass to charge ratio, the multiply charged ions appear at the exit of the drift tube earlier than the singly charged ions since they have a higher ion mobility through the drift tube. The mass to charge ratio transmission window of the quadrupole mass filter is scanned in synchronism with the operation of the ion mobility separator, and such that the lowest mass to charge ratio able to be transmitted by the mass filter progressively increases with time. As such, the mass filter filters out the singly charged ions, which are relatively slow to exit the ion mobility separator, and transmits the multiply charged ions. However, in such conventional techniques it is necessary to accumulate ions and pulse them into the drift tube, leading to space-charge limitations caused by relatively high concentrations of the ions of interest and/or the many background ions present.

SUMMARY

The present invention provides a method of filtering ions comprising:
providing an ion filter having an ion entrance, an ion exit and a plurality of electrodes;
applying an AC and/or RF voltage to at least a first electrode so as to generate a pseudo-potential barrier; and
urging ions towards the pseudo-potential barrier as they travel from the entrance to the exit whilst maintaining the ion filter at a pressure such that first ions are repelled by the pseudo-potential barrier and so are transmitted through the filter to said exit, whereas second ions having substantially the same mass to charge ratio as the first ions but a lower mass are not capable of being repelled by the pseudo-potential barrier and reaching said exit.

The invention enables ions having the same mass to charge ratio but different masses to be separated from each other. This may be used, for example, to reduce chemical noise and/or space-charge effects during the analysis of ions.

Ions that are repelled by the pseudo-potential barrier are prevented from leaving the ion filter between the ion entrance and ion exit. In contrast, if said second ions are present in the ions entering the ion filter they are not repelled by the pseudo-potential barrier and so are not transmitted to the ion exit, but are instead filtered out by the ion filter.

For the avoidance of doubt, the first ions that are transmitted by the filter have a higher charge state than said second ions.

The method may comprise selecting a range of mass to charge ratios of interest and a minimal charge state of interest; and selecting the parameters of the pseudo-potential barrier to repel ions having said mass to charge ratios of interest and selecting the pressure at which the ion filter is maintained based on the selected minimal charge state of interest such that ions having said range of mass to charge ratios of interest and a charge state above a first value are repelled by the pseudo-potential barrier and transmitted to the exit of the ion filter, whereas ions having other mass to charge ratios and charge states at or below said first value are not repelled by the pseudo-potential barrier and are filtered out by the ion filter.

The first value may be 1. Accordingly, the ions of interest may be multiply charged ions having said range of mass to charge ratios, and may be repelled by the pseudo-potential barrier and transmitted to the exit of the ion filter; whereas singly charged ions having said range of mass to charge ratios may not be repelled by the pseudo-potential barrier and filtered out by the ion filter.

Alternatively, the first value may be 2, 3, 4, 5, 6, 7, 8, 9, 10, 11, 12, 13, 14, 15, or a value ≥20; ≥25; ≥30; ≥35; ≥40; ≥45; or ≥50.

The method may comprise selecting or controlling the type and/or composition of gas in the ion filter based on the ions of interest.

For example, the type of gases and/or gas composition supplied to the ion filter may be selected or varied with time based on the ions desired to be filtered out. For example, gas can be provided that has a relatively high interaction efficiency (larger collision cross section) with ions that are desired to be filtered out.

The ions transmitted to the exit of the ion filter may travel along an ion transmission axis through the filter, wherein said at least one first electrode is arranged on one side of the ion transmission axis and at least one second electrode is arranged on an opposing side of the ion transmission axis.

The method may comprise applying an AC and/or RF voltage to the at least one second electrode so as to generate a pseudo-potential barrier that repels the first ions away from the at least one second electrode but, optionally, is not capable of repelling the second ions away from the at least one second electrode. Arranging such first and second electrodes on either side of the transmission axis may be useful, for example, if a gas flow is directed radially outwards from axis to urge ions into the pseudo-potential barrier.

The AC and/or RF voltage applied to the at least one first electrode may be the same as the AC and/or RF voltage applied to the at least one second electrode. Alternatively, the voltages may be different.

Voltages may be applied to the first and second sets of electrodes such that a DC voltage gradient is provided therebetween, which may be used to urge the ions into the pseudo-potential barrier. The magnitude and/or direction of the DC voltage gradient may be varied with time.

Said at least one first electrode and/or said at least one second electrode may comprise at least one elongated electrode having a longitudinal axis extending between the ion entrance and ion exit.

Alternatively, or additionally, said at least one first electrode and/or said at least one second electrode may comprise a plurality of electrodes arranged along a longitudinal axis extending between the ion entrance and ion exit. Each of these plurality of electrodes may be elongated.

It is contemplated that the ion transmission axis may be linear or non-linear. Accordingly, the electrodes of the ion filter may be elongated and either linear or non-linear (e.g. a curved multipole). The axis through the ion entrance may then be displaced from the axis through the ion exit. This may be beneficial as it prevents neutrals being transmitted from the ion entrance to the ion exit.

The step of urging ions towards the pseudo-potential barrier may comprise urging the ions orthogonal to the ion transmission axis of the ion filter, or at an angle to such axis.

The step of urging ions towards the pseudo-potential barrier may comprise urging the ions using a gas flow.

For example, a gas flow may be directed along the transmission axis, but may diverge outwards towards the pseudo-potential barrier.

The method may comprise arranging the ion filter in a chamber having a gas inlet port and a gas outlet port through which gas is pumped out of the chamber, wherein the gas inlet and outlet ports are arranged within the chamber so as to provide said gas flow for urging the ions.

The step of urging ions towards the pseudo-potential barrier may comprise urging the ions using a DC voltage gradient or an electric field that varies with time over a timescale exceeding 10 ms.

The step of urging ions towards the pseudo-potential barrier may comprise urging the ions with a force having a component in a direction towards the pseudo-potential barrier and a component in a direction towards the ion exit.

Alternatively, separate means may be provided for urging ions towards the pseudo-potential barrier and urging the ions towards the ion exit.

The method may comprise urging ions towards the ion exit by one or more of the following: (i) travelling an electric potential barrier in a direction towards the ion exit;
(ii) providing a DC potential gradient; (iii) providing a gas flow; or (iv) arranging elongated electrodes or electrode sets on opposing sides of the ion transmission axis, wherein the opposing electrodes or electrode sets diverge from each other in a direction towards the ion exit.

The opposing electrodes or electrode sets may be the at least one first electrode opposing the at least one second electrode.

The method may comprise varying the frequency of the AC and/or RF voltage with time such ions having different ranges of masses are transmitted, or are capable of being transmitted, by the ion filter at different respective times.

The peak-to-peak amplitude of the AC and/or RF voltage may be: ≥1000 Volts; ≥900 Volts; ≥800 Volts; ≥700 Volts; ≥600 Volts; ≥500 Volts; ≥400 Volts; ≥300 Volts; ≥200 Volts; or ≥100 Volts The use of relatively low amplitude voltages reduces the risk of an electrical discharge in the gas.

Additionally, or alternatively, the pressure in the ion filter may be varied with time such ions having different ranges of masses are transmitted, or are capable of being transmitted, by the filter at different respective times.

The pressure and/or frequency may be varied with time based on the ions of interest desired to be transmitted, i.e. different ions may be desired to be transmitted at different times.

Ions may not be confined in a direction between the ion entrance and ion exit.

The pressure in the ion filter may be maintained at a pressure of P Torr, wherein P is selected from the group consisting of: ≥10; ≥20; ≥30; ≥40; ≥50; ≥60; ≥70; ≥80; ≥90; ≥100; ≥120; ≥140; ≥160; ≥180; ≥200; ≥250; or ≥300; and optionally wherein the pressure P is sub-ambient pressure.

The method may comprise: a) applying voltages to the electrodes of the ion filter so that the filter is capable of transmitting ions having a mass to charge ratio of interest, or a range of mass to charge ratios of interest; and then b) varying the pressure in the ion filter, whilst performing said urging of ions towards the pseudo-potential barrier, until the pressure is such that that multiply charged ions having said mass to charge ratio(s) of interest are repelled by the pseudo-potential barrier and so are transmitted through the filter to said exit, whereas singly charged ions having said mass to charge ratio(s) of interest are not capable of being repelled by the pseudo-potential barrier and are filtered out by the filter.

It is also contemplated that the filter may be operated to transmit relatively high charge states and remove charge states below this. Accordingly, the multiply charged ions having said mass to charge ratio(s) of interest that are repelled by the pseudo-potential barrier may have charge states of 3, 4, 5, 6, 7, 8, 9, 10, 11, 12, 13, 14, 15, or a value ≥20; ≥25; ≥30; ≥35; ≥40; ≥45; or ≥50. Ions having charge states below this may be filtered out by the ion filter along with the singly charged ions.

The voltages applied to the electrodes so that filter is capable of transmitting ions having mass to charge ratios of interest may be said AC and/or RF voltage that generates the pseudo-potential barrier, or another AC and/or RF voltage. In either embodiment, the pseudo-potential barrier generated filters the ions by mass to charge ratio, as certain mass to charge ratios are repelled by the pseudo-potential barrier and transmitted by the filter, whereas other mass to charge ratios are not repelled and are filtered out. The efficiency with which the pseudo-potential barrier repels an ion is dependent on the mass to charge ratio of the ion and the force with which the ion is driven against the barrier, with the efficiency being maximum at a particular mass to charge ratio. As the pressure in the ion filter is varied, the range of mass to charge ratios repelled by the pseudo-potential barrier varies. Accordingly, after the pressure has been varied it may be desired to adjust the frequency and/or amplitude of the AC and/or RF voltage, e.g. such that the filter transmits said mass to charge ratio(s) of interest with higher efficiency.

After step b) above, the method further comprises maintaining the pressure substantially constant and altering the frequency and/or amplitude of the voltages applied in step a), optionally such that ions having said mass to charge ratio(s) of interest are transmitted by the filter with improved efficiency.

The present invention also provides a method of mass and/or ion mobility spectrometry comprising:
    a method of filtering ions as disclosed herein; and
    mass analysing and/or ion mobility analysing ions transmitted by the ion filter, or ions derived therefrom.

The method may comprise generating ions using an ion source for generating multiply charge ions. For example, the ion source may be an ESI ion source. However, other ion sources may be used, such as a MALDI ion source. The ion source may be an atmospheric pressure ion source.

The method comprises supplying these ions, or ions derived therefrom, to the ion entrance of the ion filter.

The ions may be ions of large molecules, such as biomolecules, proteins or their complexes. Alternatively, the ions may be ions of inorganic nanoparticles.

Ions transmitted by the ion filter may be subjected to one or more of the following processes: mass to charge ratio separation or filtering; fragmentation in a fragmentation cell such as a collision cell, or reaction in a reaction cell.

The ions transmitted by the ion filter, or ions derived therefrom, are then analysed in a mass analyser or ion mobility analyser.

The method may be a method of screening a sample for compound (i.e. ion) of interest. For example, if an ion is detected as being transmitted by the ion filter then it may be determined that the compound/ion of interest is present in the sample being analysed.

The present invention also provides an ion filter comprising:
    an ion entrance, an ion exit and a plurality of electrodes;
    a voltage supply for applying an AC and/or RF voltage to at least a first of the electrodes so as to generate a pseudo-potential barrier;
    a gas control mechanism for controlling the gas pressure within the ion filter;
    an ion urging device; and
    a controller configured and set up to:
    control the ion urging device so as to urge ions towards the pseudo-potential barrier as they travel from the ion entrance towards the ion exit and control the gas control mechanism so as to maintain the ion filter at a pressure such that first ions are repelled by the pseudo-potential barrier and transmitted through the filter to said exit, whereas second ions having substantially the same mass to charge ratio as the first ions but a lower mass are not capable of being repelled by the pseudo-potential barrier and reaching said exit.

The ion filter may be arranged and configured to perform any of the methods described herein.

The present invention also provides a mass and/or ion mobility spectrometer comprising: and ion filter as described herein; and a mass analyser and/or ion mobility analyser.

The spectrometer may comprise any ion source, such as an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells, which may be arranged downstream of the ion filter. For example, the one or more collision, fragmentation or reaction cells may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser for analysing ions downstream of the ion filter. The analyser may be selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters, e.g. selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

Ions may be analysed downstream of the ion filter in an MS, MS-MS, IMS-MS or MSn method. For example, the ion filter may filter parent or precursor ions, but any mode of analysis may be employed downstream of the ion filter, such as optical spectroscopy, ion mobility analysis, or even simple ion current measurements.

The ions or sample from which they derive may be prepared upstream of the ion filter. For example, the ions or sample may be subject to desolvation or declustering upstream of the ion filter.

Embodiments of the invention avoid chemical noise and minimise space-charge effects during the analysis of relatively large molecules such as intact proteins and their complexes. For example, the various embodiments herein may separate complex biomolecules (ions), e.g. for screening and analysis. However, it is contemplated that other types of ions may be separated, such as inorganic ions, e.g. nanoparticles.

Embodiments may be used, for example, to filter all singly charged ions in the range of masses of 300-3000 Da (i.e. a m/z range of 300-3000), whilst transmitting all large multiply charged ions in the same range of mass to charge ratios (e.g. masses in the range of ~3000 to 300000 and higher).

BRIEF DESCRIPTION OF THE DRAWINGS

Various embodiments will now be described, by way of example only, and with reference to the accompanying drawings in which:

FIG. 1 shows an ion filter according to an embodiment of the invention.

DETAILED DESCRIPTION

Although the terms "mass to charge ratio" and "mass" are often used interchangeably in the field of mass spectrometry when referring to properties of ions, this is not technically correct (except for singly charged ions). The term "mass to charge ratio" of an ion used herein refers to the mass of an ion divided by the number of electronic charges it carries, whereas the "mass" of an ion refers simply to its mass (not divided by its charge state).

Embodiments of the present invention relate to separating ions having similar mass to charge ratios but different masses and charge-states. For example, embodiments relate to separating low-mass, low-charge ions from high-mass, high-charge ions. This is useful, for example, in removing singly-charged relatively low mass background ions from heavier multiply charged ions of interest.

FIG. 1 shows a schematic of an instrument according to an embodiment of the present invention. The instrument comprises a first chamber 2 comprising an ion inlet 4, an RF ion filter 6, a gas input unit 7, a pressure controller 9, a gas pump 8, a gas outlet 10 through which the pump 8 may pump gas out of first chamber 2, a second chamber 12 comprising a mass analyser, and an inter-chamber orifice 14.

In operation, the gas pump 8 pumps gas out of the first chamber 2 through the gas outlet 10 and the pressure controller 9 is set such that the chamber 2 reaches the desired pressure. Ions 16 are then received into the first chamber 2 through the ion inlet 4 and continue into the RF ion filter 6. The RF ion filter 6 comprises a quadrupole rod set 18 and an RF voltage source connected to the electrodes of the rod set. Circumferentially adjacent electrodes in the rod set may be connected to different (e.g. opposite) phases of the RF voltage source. The amplitude and frequency of the voltages applied to the ion filter 6 are selected so as to transmit ions having the desired range of mass to charge ratios.

The application of the RF voltages to the electrodes of the rod set generates a time-varying electric field that forms a pseudo-potential barrier for inhibiting the motion of ions radially outwards from within ion filter. The ions 16 that enter the RF ion guide 6 are urged in a direction 20 from the ion transmission axis that extends longitudinally through the ion filter 6 towards the pseudo-potential barrier generated by applying the RF voltage to the electrodes 18. Ions may be urged in direction 20, for example, by a gas flow or by a DC voltage gradient. For reasons that will be discussed in more detail below, when the pressure in the chamber 2 is set correctly, this causes relatively low mass ions having the desired range of mass to charge ratios to be urged through the pseudo-potential barrier and out of the ion filter 6, whereas relatively higher mass ions having the desired range of mass to charge ratios are unable to be urged out of the ion filter 6 due to being repelled by the pseudo-potential barrier. The low mass ions are therefore filtered out by the ion filter 6, whereas the higher mass ions 22 continue to be transmitted along the ion transmission axis of the ion filter 6, through the inter-chamber orifice 14 and into the second chamber 12, wherein these ions may be mass analysed by the mass analyser. Accordingly, different ions having the same mass to charge ratio but different masses and charges may be separated by the ion filter 6.

The principle of operation of the ion filter 6 will now be described. The application of an RF voltage to the electrodes generates an inhomogeneous RF electric field having regions of different field strength. Under vacuum conditions and at relatively low pressures, ions of both polarity are oscillated back and forth by the RF field, but experience an overall time-averaged force in a direction towards regions of lower RF field strength. This is known as a pseudo-potential barrier and is effective at repelling ions under vacuum and low pressure conditions, i.e. if ion velocity is shifted by phase relative to the electric field. However, at higher gas pressures the oscillating ions collide with the background gas molecules to an extent such that the application of the RF voltage to the electrodes does not result in a pseudo-potential barrier that repels these ions. Accordingly, as the pressure of the background gas increases the RF voltage applied to the electrodes becomes less effective at repelling ions.

Moreover, at a given background gas pressure, lighter ions (or ions with larger cross-sections) are more affected by the presence of the background gas than heavier ions. The background gas pressure at which the RF voltage applied to the electrodes becomes ineffective at repelling ions therefore depends on the mass of the ion (and to a lower extent on ion cross-section). As such, at a gas pressure above vacuum pressure, the RF voltage applied to the electrodes will not form a pseudo-potential barrier capable of repelling some relatively light ions but will form a pseudo-potential barrier capable of repelling heavier ions.

The frequency of the RF voltage also affects the background gas pressure at which ions are no longer repelled by applying the RF voltage to the electrode. For a given ion, the lower the frequency of the RF voltage applied to the electrode, the lower the pressure the background gas must be for RF voltage to generate a pseudo-potential barrier that repels the ion.

Referring back to FIG. 1, the above described principle is used by applying the RF voltage to electrodes 18 of the ion filter 6 such that the ion filter 6 transmits high mass ions having the desired range of mass to charge ratios and filters out low mass ions having the desired range of mass to charge ratios.

As mentioned above, the pressure inside the chamber 2 affects the masses of the ions that are transmitted by the filter 6. The voltages applied to the filter 6 are set so that the filter 6 is capable of transmitting ions having the desired range of mass to charge ratios. Ions are supplied to the filter 6 and an ion detector may be used to detect the ions transmitted by the filter 6. The ion signal from the detector may be fed back to a controller that controls the gas pressure in the chamber 2 in response to the ion signal (e.g. based on the intensity of the ion signal). The apparatus may include a pressure sensor for monitoring the pressure in the filter 6 or chamber 2, which may optionally be fed back to the controller for use in controlling the pressure. In response to the ion signal, the controller may vary the gas pressure in the chamber 2 until the ion signal from the detector reduces, indicating that low mass ions have been filtered out by the filter 6. The controller may then maintain the chamber 2 at this pressure such that low mass ions are filtered out and the higher mass ions transmitted by the filter 6. The frequency and/or amplitude of the voltages applied to the filter 6 may then be altered for optimising the transmission of the higher mass ions transmitted by the filter 6. For example, this may be performed automatically by detecting the transmitted ions and feeding the resulting detector signal back to control means that make variations to the frequency and/or amplitude of the voltages applied to the filter 6 until the detector signal is optimised. The ions transmitted by the filter 6 may then be detected and/or analysed according to any of the various techniques described herein.

The pressure inside the chamber 2 may be varied by the pressure controller 9, which may be a gas valve that selectively controls the rate at which gas enters the first chamber 2. This allows the gas pump 8 to evacuate the chamber 2 at a constant rate (or to be emitted if the chamber 2 is pumped by a downstream chamber). This also allows gases other than ambient air to fill the chamber 2 as, for example, the pressure controller 9 may allow gases other than ambient air to flow from gas input unit 7 into the chamber 2. The type and/or composition of gas transmitted from gas input unit 7 into the chamber 2 may be selected depending on the ions desired to be transmitted by the filter 6.

Although the ion filter 6 has been described above as comprising a quadrupole rod set, it is contemplated that the ion filter 6 may take a number of alternative forms. For example, the ion filter 6 may comprise a multipole rod set other than a quadrupole rod set. Alternatively, the ion filter 6 may comprise a single RF electrode to which the RF voltage is applied and another (e.g. DC or grounded) electrode, so that the pseudo-potential barrier is formed therebetween (e.g. similar to a monopole mass analyser). Alternatively, the ion filter 6 may comprise at least two electrodes arranged on opposing sides of the ion transmission axis. The RF voltage may be applied to one or both or the electrodes. Alternatively, the RF ion filter 6 may comprise a plurality of electrodes arranged side-by-side, to which the RF voltage is applied. Different (e.g. opposite) phases of the RF voltage may be applied to adjacent electrodes. Optionally, at least some of the electrodes described herein to which the RF voltage is applied may be elongated in a direction along the ion transmission axis.

As described above, a DC voltage gradient may be used to urge the ions towards the pseudo-potential barrier, so as cause the ions to be filtered according to mass. In these embodiments, the DC voltage gradient may be provided by applying a DC potential difference between electrodes arranged on opposing sides of the ion transmission axis. It is contemplated that the DC and RF voltages may be applied to the same electrodes. Alternatively, separate RF and DC electrodes may be provided.

Alternatively, or additionally, it is contemplated that a gas flow be used to urge the ions towards the pseudo-potential barrier, so as cause the ions to be filtered according to mass. In these embodiments, the gas outlet port 10 may be arranged such that the gas flow caused by the gas pump 8 is the gas flow that drives the ions against the pseudo-potential barrier. Accordingly, the gas pump 8 may cause a gas flow from the ion inlet aperture 4 to the gas outlet port 10 which draws ions into the ion filter 6 and urges the ions against the pseudo-potential barrier, so as cause the ions to be filtered according to mass.

Alternatively, or additionally, it is contemplated that thermal motion may be used to urge ions towards the pseudo-potential barrier. In these embodiments ions entering the filter are subjected to thermal stochastic motion, which spreads the ion flow and urges them into the surrounding pseudo-potential barrier. The ion transmission path through the filter may be made relatively long so as to ensure that only a negligible portion of the ions that exit the filter have not been stochastically directed to the pseudo-potential barrier.

It is also contemplated that ions may be driven along the ion transmission axis so that the non-filtered ions 22 reach the exit of the ion filter 6 and pass through the inter-chamber orifice 14 into the second chamber 12. This may be achieved by providing a gas flow. For example, a gas flow may be arranged at an acute or obtuse angle to the ion transmission axis such that the gas flow both urges towards the pseudo-potential barrier and also along the ion transmission axis towards the exit of the ion filter 6. Alternatively, the second chamber 12 may be pumped to a lower pressure than the first chamber 2 so that a gas flow is created from the first chamber 2 to the second chamber 12 that draws ions towards the exit of the ion filter 6 and into the second chamber 12.

Alternatively, or additionally, voltages may be applied to electrodes so as to urge ions along the ion transmission axis of the filter 6 so that the ions transmitted by the filter 6 reach the exit of the ion filter 6 and pass through the inter-chamber orifice 14 into the second chamber 12. This may be achieved by providing a plurality of electrodes along the length of the transmission axis and applying different DC voltages to these electrodes. The RF electrode 18 may be segmented so as to provide this plurality of electrodes. Alternatively, electrodes separate from RF electrode 18 may be provided for performing this function.

Additionally, or alternatively, one or more voltages may be progressively and successively applied to the different electrodes such that a DC potential barrier travels along the ion transmission axis and drives or sweeps ions along the ion transmission axis. The RF electrode(s) may be segmented so as to provide these different electrodes. Alternatively, electrodes separate from RF electrode(s) may be provided for performing this function.

Additionally, or alternatively, elongated electrodes or electrode sets may be arranged on opposing sides of the ion transmission axis, wherein the opposing electrodes or electrode sets diverge from each other in a direction towards the ion exit. These electrodes may be the same as the RF electrodes or may be separate electrodes. Voltages (e.g. DC voltages) may be applied to these electrode so as to urge ions towards the ion exit.

Additionally, or alternatively, space-charge (Coulomb) repulsion may be used to urge ions towards the ion exit.

A specific embodiment of the ion filter 6 was simulated and will now be described, by way of example only, in order to demonstrate the effectiveness of filtering ions according to mass. The ion filter comprised a quadrupole electrode rod set having a length of 100 mm, an internal diameter of 6 mm and filled with nitrogen gas at a pressure of 30 Torr. A DC voltage gradient was maintained along the axis of the quadrupole so as to establish an electric field of 0.1 V/mm for urging ions from the entrance to the exit of the quadrupole. An RF voltage having a frequency of 1 MHz and an amplitude of 100 V (zero-peak) was applied to the quadrupole electrodes in order to establish the pseudo-potential barrier for repelling and radially confining high mass ions within the quadrupole. A gas flow was modeled as passing through the quadrupole in a direction orthogonal to the axis of the quadrupole for urging ions into the pseudo-potential barrier, and having a gas flow speed of 2 m/s. Singly charge ions having masses of 100, 300 and 2000 (i.e. m/z of 100, 300 and 2000) were modeled as being introduced into the entrance of the quadrupole. Ions having a mass of 1500 and a charge state of 5 (i.e. a m/z of 300) were also modeled as being introduced into the entrance of the quadrupole. Ions having a mass of 100,000 and a charge state of 50 (i.e. a m/z of 2000) were also modeled as being introduced into the entrance of the quadrupole.

All of these ions have a mass to charge ratio in the range of 100-2000, but it was determined that the singly charged ions were driven through the pseudo-potential barrier by the orthogonal gas flow and were filtered out before reaching the exit of the quadrupole rod set, whereas the higher mass multiply charged ions were repelled and confined within the rod set by the pseudo-potential barrier and hence were transmitted to the exit of the rod set. More specifically, for the two types of ions having a mass to charge ratio of 300, the singly charged low mass ions (mass of 300) were filtered out, whereas the high mass ions having a charge state of 5 (mass of 1500) were transmitted. Similarly, for the two types of ions having a mass to charge ratio of 2000, the singly charged low mass ions (mass of 2000) were filtered out, whereas the high mass ions having a charge state of 50 (mass of 100,000) were transmitted.

Although the present invention has been described with reference to preferred embodiments, it will be understood by those skilled in the art that various changes in form and detail may be made without departing from the scope of the invention as set forth in the accompanying claims

The invention claimed is:

1. A method of filtering ions comprising:
   providing an ion filter having an ion entrance, an ion exit and a plurality of electrodes;
   applying an AC and/or RF voltage to at least a first electrode so as to generate a pseudo-potential barrier; and
   urging ions towards the pseudo-potential barrier as they travel from the entrance to the exit whilst maintaining the ion filter at a pressure such that:
   first ions are prevented from passing through the pseudo-potential barrier by being repelled by the pseudo-potential barrier and so are transmitted through the filter to said exit, whereas second ions having substantially the same mass to charge ratio as the first ions but a lower mass are not prevented from passing through the pseudopotential barrier by being repelled by the pseudo-potential barrier, such that the second ions pass through the pseudo-potential barrier and out of the ion filter without reaching said exit.

2. The method of claim 1, comprising selecting a range of mass to charge ratios of interest and a minimal charge state of interest; and selecting the parameters of the pseudopotential barrier to repel ions having said mass to charge ratios of interest and selecting the pressure at which the ion filter is maintained based on the selected minimal charge state of interest such that ions having said range of mass to charge ratios of interest and a charge state above a first value are repelled by the pseudo-potential barrier and transmitted to the exit of the ion filter, whereas ions having other mass to charge ratios and charge states at or below said first value are not repelled by the pseudopotential barrier and are filtered out by the ion filter.

3. The method of claim 2, comprising selecting or controlling the type and/or composition of gas in the ion filter based on the ions of interest.

4. The method of claim 1, wherein the ions transmitted to the exit of the ion filter travel along an ion transmission axis through the filter, wherein said at least one first electrode is arranged on one side of the ion transmission axis and at least one second electrode is arranged on an opposing side of the ion transmission axis.

5. The method of claim 1, wherein said at least one first electrode and/or said at least one second electrode comprises at least one elongated electrode having a longitudinal axis extending between the ion entrance and ion exit.

6. The method of claim 1, wherein the step of urging ions towards the pseudo-potential barrier comprises urging the ions using a gas flow.

7. The method of claim 6, comprising arranging the ion filter in a chamber having a gas inlet port and a gas outlet port through which gas is pumped out of the chamber, wherein the gas inlet and outlet ports are arranged within the chamber so as to provide said gas flow for urging the ions.

8. The method of claim 1, wherein the step of urging ions towards the pseudo-potential barrier comprises urging the ions using a DC voltage gradient or an electric field that varies with time over a timescale exceeding 10 ms.

9. The method of claim 1, wherein the step of urging ions towards the pseudo-potential barrier comprises urging the ions with a force having a component in a direction towards the pseudo-potential barrier and a component in a direction towards the ion exit.

10. The method of claim 1, comprising urging ions towards the ion exit by one or more of the following:
   (i) travelling an electric potential barrier in a direction towards the ion exit;
   (ii) providing a DC potential gradient;
   (iii) providing a gas flow; or
   (iv) arranging elongated electrodes or electrode sets on opposing sides of the ion transmission axis, wherein the opposing electrodes or electrode sets diverge from each other in a direction towards the ion exit.

11. The method of claim 1, comprising varying the frequency of the AC and/or RF voltage with time such that ions having different ranges of masses are transmitted, or are capable of being transmitted, by the ion filter at different respective times.

12. The method of claim 1, wherein the pressure in the ion filter is maintained at a pressure of P Torr, wherein P is selected from the group consisting of: $\geq 10$; $\geq 20$; $\geq 30$; $\geq 40$; $\geq 50$; $\geq 60$; $\geq 70$; $\geq 80$; $\geq 90$; $\geq 100$; $\geq 120$; $\geq 140$; $\geq 160$; $\geq 180$; $\geq 200$; $\geq 250$; or $\geq 300$; and optionally wherein the pressure P is sub-ambient pressure.

13. The method of claim 1, comprising:
   a) applying voltages to the electrodes of the ion filter so that the filter is capable of transmitting ions having a mass to charge ratio of interest, or a range of mass to charge ratios of interest; and then
   b) varying the pressure in the ion filter, whilst performing said urging of ions towards the pseudo-potential barrier, until the pressure is such that that multiply charged ions having said mass to charge ratio(s) of interest are repelled by the pseudo-potential barrier and so are transmitted through the filter to said exit, whereas singly charged ions having said mass to charge ratio(s) of interest are not capable of being repelled by the pseudo-potential barrier and are filtered out by the filter.

14. The method of claim 13, wherein after step b) the method further comprises maintaining the pressure substantially constant and altering the frequency and/or amplitude of the voltages applied in step a), optionally such that ions having said mass to charge ratio(s) of interest are transmitted by the filter with improved efficiency.

15. A method of mass and/or ion mobility spectrometry comprising:
   a method of filtering ions as claimed in claim 1; and
   mass analysing and/or ion mobility analysing ions transmitted by the ion filter, or ions derived therefrom.

16. An ion filter comprising:
   an ion entrance, an ion exit and a plurality of electrodes;
   a voltage supply for applying an AC and/or RF voltage to at least a first of the electrodes so as to generate a pseudo-potential barrier;
   a gas control mechanism for controlling the gas pressure within the ion filter; and
   a controller configured and set up to:
   control the ion filter so as to urge ions towards the pseudo-potential barrier as they travel from the ion entrance towards the ion exit and control the gas control mechanism so as to maintain the ion filter at a pressure such that:
   first ions are prevented from passing through the pseudo-potential barrier by being repelled by the pseudo-potential barrier such that the first ions are transmitted through the filter to said exit, whereas second ions having substantially the same mass to charge ratio as the first ions but a lower mass are not prevented from passing through the pseudo-potential barrier by being repelled by the pseudo-potential barrier, such that the second ions pass through the pseudo-potential barrier and out of the ion filter without reaching said exit.

17. A mass and/or ion mobility spectrometer comprising:
an ion filter as claimed in claim 16; and
a mass analyser and/or ion mobility analyser.

18. The method of claim 1, wherein:
the pseudo-potential barrier is for inhibiting the motion of ions radially outwards from within the ion filter; and
the step of urging ions towards the pseudo-potential barrier comprises urging the ions radially outwards towards the pseudo-potential barrier.

19. The ion filter of claim 16, wherein:
the pseudo-potential barrier is for inhibiting the motion of ions radially outwards from within the ion filter; and
the controller is configured and set up to control the ion filter so as to urge ions radially outwards towards the pseudo-potential barrier as they travel from the ion entrance towards the ion exit.

20. A method of filtering ions comprising:
providing an ion filter having an ion entrance, an ion exit and a plurality of electrodes, wherein an ion transmission axis through the ion filter joins the ion entrance and the ion exit;
urging a plurality of ions to travel from the ion entrance along the ion transmission axis towards the ion exit, the plurality of ions comprising first ions and second ions, wherein the second ions have substantially the same mass to charge ratio as the first ions but a lower mass than the first ions;
applying an AC and/or RF voltage to at least a first electrode of the plurality of electrodes so as to generate a pseudo-potential barrier around the ion transmission axis for inhibiting the motion of ions radially outwards from within the ion filter; and
urging the plurality of ions radially outwards towards the pseudo-potential barrier as they travel from the ion entrance towards the ion exit whilst maintaining the ion filter at a pressure, wherein the pressure is such that, when the plurality of ions are urged radially outwards towards the pseudo-potential barrier:
the first ions are prevented from passing through the pseudo-potential barrier by being repelled by the pseudo-potential barrier such that the first ions are maintained within the ion filter until the first ions are transmitted along the ion transmission axis through the ion filter to said ion exit, whereas the second ions are not prevented from passing through the pseudo-potential barrier by being repelled by the pseudo-potential barrier such that the second ions are not maintained within the ion filter and do not reach said ion exit.

* * * * *